(12) United States Patent
Li et al.

(10) Patent No.: US 10,983,612 B2
(45) Date of Patent: Apr. 20, 2021

(54) STYLUS AND HUMAN-MACHINE INTERACTIVE APPARATUS

(71) Applicants: Hefei BOE Optoelectronics Technology Co., Ltd., Anhui (CN); BOE Technology Group Co., Ltd., Beijing (CN)

(72) Inventors: Chunhua Li, Beijing (CN); Guanglei Yang, Beijing (CN); Meng Wang, Beijing (CN); Zhixiang Fang, Beijing (CN); Xuxu Hu, Beijing (CN)

(73) Assignees: Hefei BOE Optoelectronics Technology Co., Ltd., Anhui (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/454,159

(22) Filed: Jun. 27, 2019

(65) Prior Publication Data

US 2020/0103987 A1 Apr. 2, 2020

(30) Foreign Application Priority Data

Sep. 27, 2018 (CN) .......................... 201811133448.5

(51) Int. Cl.
| | | |
|---|---|---|
| *G06F 3/0354* | (2013.01) | |
| *G06F 3/0346* | (2013.01) | |
| *G06F 3/038* | (2013.01) | |
| *G06F 3/041* | (2006.01) | |
| *G06F 3/042* | (2006.01) | |

(52) U.S. Cl.
CPC ........ *G06F 3/03545* (2013.01); *G06F 3/0346* (2013.01); *G06F 3/0383* (2013.01); *G06F 3/0386* (2013.01); *G06F 3/03542* (2013.01); *G06F 3/042* (2013.01); *G06F 3/04162* (2019.05)

(58) Field of Classification Search
CPC combination set(s) only.
See application file for complete search history.

(56) References Cited

U.S. PATENT DOCUMENTS

| | | | | |
|---|---|---|---|---|
| 2014/0166851 A1* | 6/2014 | Kim | ...................... | G06F 3/0308 250/205 |
| 2019/0196607 A1* | 6/2019 | Wang | ................... | G06F 3/0414 |
| 2019/0297698 A1* | 9/2019 | Akiyama | ................ | G06F 3/038 |

* cited by examiner

*Primary Examiner* — Deeprose Subedi
(74) *Attorney, Agent, or Firm* — Arent Fox LLP; Michael Fainberg

(57) ABSTRACT

The disclosure discloses a stylus and a human-machine interactive apparatus. The stylus includes: a body, including a refill, a housing and a clamping piece; wherein the refill can perform a lever deflection motion by taking the clamping piece as a pivot when it is under a pressure; a light emitter, fixed at an end portion of the refill and has a light emitting surface facing away from the refill; a light signal sensing element on a side of the end portion of the refill and configured to sense a light beam emitted by the light emitter and to output coordinate information of a position irradiated by the light beam; and a micro control unit configured to generate a corresponding drive signal according to the coordinate information output by the light signal sensing element and to send the drive signal to a touch screen via the refill.

20 Claims, 3 Drawing Sheets

STYLUS AND HUMAN-MACHINE INTERACTIVE APPARATUS

CROSS-REFERENCE TO RELATED APPLICATION

This Application claims priority to Chinese Patent Application No. 201811133448.5, filed on Sep. 27, 2018, the content of which is incorporated by reference in the entirety.

FIELD

This disclosure relates to the field of touch technologies, and particularly to a stylus and a human-machine interactive apparatus.

DESCRIPTION OF THE RELATED ART

With the development of touch technologies, more and more mobile terminals use a touch mode to implement a human-machine interaction. Where a stylus is a tool commonly used for the human-machine interaction, and a working principle of the stylus in the related art is based on the fact that a screen of an electronic device may transmit a certain pressure to a refill during writing, and a pressure detection element inside the refill of the stylus receives the pressure signal, processes the received pressure signal, and then transmits the signal to the screen of the electronic device via a conductive component and the refill to thereby be coupled to a capacitor at a screen side, thus written contents will be presented on a display, namely a touch display screen, of the electronic device. However, as the touch technologies and the demands of people for the touch operations are increasing, it is difficult for a simple pressure response to meet the high requirements for application experience such as painting, of people. Therefore, how to develop a stylus with a new design has become an important research direction in the touch field.

SUMMARY

Embodiments of the disclosure provide a stylus and a human-machine interactive apparatus.

In an aspect, the embodiments of the disclosure provide a stylus, including: a body, wherein the body includes a refill, a housing surrounding the refill, and a clamping piece between the refill and the housing; wherein the refill is able to perform a lever deflection motion by taking the clamping piece as a pivot when it is under a pressure; a light emitter, fixed at an end portion of the refill and has a light emitting surface facing away from the refill; a light signal sensing element, on a side of the end portion of the refill and configured to sense a light beam emitted by the light emitter and to output coordinate information of a position irradiated by the light beam; and a micro control unit, connected with the light signal sensing element via a signal and configured to generate a corresponding drive signal according to the coordinate information output by the light signal sensing element and to send the drive signal to a touch screen via the refill.

In some embodiments, the clamping piece includes a front clamping piece and a rear clamping piece, the front clamping piece is connected with the refill, and the rear clamping piece is connected with the housing; wherein the body further includes a spring piece; wherein a front end of the spring piece is connected with the front clamping piece, and a rear end of the spring piece is abutted with the rear clamping piece.

In some embodiments, the light signal sensing element is a light sensor panel or a light sensor layer including at least one light sensor.

In some embodiments, the micro control unit is further configured to: identify a corresponding position coordinate after receiving the coordinate information output by the light signal sensing element; calculate a distance between the identified position coordinate and an initial center coordinate; and generate a drive signal according to the calculated distance;

wherein the initial center coordinate is a position coordinate of the light beam sensed by the light signal sensing element when the refill is under no pressure.

In some embodiments, a set number of distance grades are stored in the micro control unit, and the distance grades correspond to a plurality of frequencies of the drive signal in a one-to-one manner; and the micro control unit is further configured to emit a drive signal with a frequency corresponding to a certain distance grade when the calculated distance is within a range of the certain distance grade.

In some embodiments, the light emitter is an infrared emitter.

In some embodiments, the light emitting surface of the light emitter is perpendicular to the refill, and faces directly to a light sensing surface of the light signal sensing element when the refill is under no pressure.

In some embodiments, the stylus further includes a power supply electrically connected to the light emitter, the light signal sensing element and the micro control unit; wherein the power supply is configured to provide power to the light emitter, the light signal sensing element and the micro control unit.

In some embodiments, the stylus further includes a power switch connected between the light emitter, the light signal sensing element, and the power supply; wherein the power switch is configured to control on and off of the light emitter and the light signal sensing element.

In some embodiments, the stylus further includes a pressure sensor and a tilt sensor; wherein the pressure sensor and the tilt sensor are connected with the micro control unit via a signal, respectively.

In another aspect, the embodiments of the disclosure provide a human-machine interactive apparatus, including the stylus according to the embodiments of the disclosure, and a touch display panel cooperatively used with the stylus.

In some embodiments, the touch display panel is configured to receive a drive signal sent by the stylus and to display lines with different thicknesses according to a change of frequency of the drive signal.

In some embodiments, the clamping piece includes a front clamping piece and a rear clamping piece, the front clamping piece is connected with the refill, and the rear clamping piece is connected with the housing; wherein the body further includes a spring piece; wherein a front end of the spring piece is connected with the front clamping piece, and a rear end of the spring piece is abutted with the rear clamping piece.

In some embodiments, the light signal sensing element is a light sensor panel or a light sensor layer including at least one light sensor.

In some embodiments, the micro control unit is further configured to: identify a corresponding position coordinate after receiving the coordinate information output by the light signal sensing element; calculate a distance between the identified position coordinate and an initial center coordinate; and generate a drive signal according to the calculated distance; wherein the initial center coordinate is a position coordinate of the light beam sensed by the light signal sensing element when the refill is under no pressure.

In some embodiments, a set number of distance grades are stored in the micro control unit, and the distance grades correspond to a plurality of frequencies of the drive signal in a one-to-one manner; and the micro control unit is further configured to emit a drive signal with a frequency corresponding to a certain distance grade when the calculated distance is within a range of the certain distance grade.

In some embodiments, the light emitter is an infrared emitter.

In some embodiments, the light emitting surface of the light emitter is perpendicular to the refill, and faces directly to a light sensing surface of the light signal sensing element when the refill is under no pressure.

In some embodiments, the stylus further includes a power supply electrically connected to the light emitter, the light signal sensing element and the micro control unit; wherein the power supply is configured to provide power to the light emitter, the light signal sensing element and the micro control unit.

In some embodiments, the stylus further includes a power switch connected between the light emitter, the light signal sensing element, and the power supply; wherein the power switch is configured to control on and off of the light emitter and the light signal sensing element.

BRIEF DESCRIPTION OF THE DRAWINGS

In order to make the technical solutions according to the embodiments of the disclosure more apparent, the drawings to which a description of the embodiments refers will be briefly introduced below, and apparently the drawings to be described below are merely illustrative of some of the embodiments of the disclosure, and those ordinarily skilled in the art can derive from these drawings other drawings without any inventive effort.

DETAILED DESCRIPTION OF THE EMBODIMENTS

Figure 1:
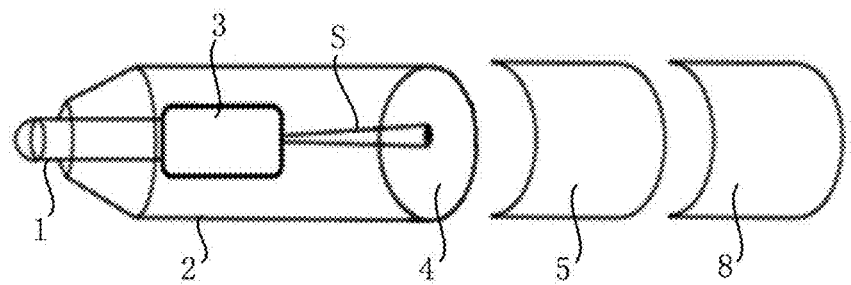
FIG. 1 is a structural schematic diagram of a stylus according to the embodiments of the disclosure.

In order to make the objects, technical solutions, and advantages of the embodiments of the disclosure more apparent, the technical solutions according to the embodiments of the disclosure will be described below clearly and fully with reference to the drawings in the embodiments of the disclosure, and apparently the embodiments described below are only a part but not all of the embodiments of the disclosure. Based upon the embodiments here of the disclosure, all the other embodiments which can occur to those skilled in the art without any inventive effort shall fall into the scope of the disclosure.

As illustrated in FIG. 1 to FIG. 5, the embodiments of the disclosure provide a stylus, including: a body, where the body includes a refill 1, a housing 2 surrounding the refill 1, and a clamping piece 6 between the refill 1 and the housing 2, where the refill 1 is able to perform a lever deflection motion by taking the clamping piece 6 as a pivot when it is under a pressure; a light emitter 3 fixed at an end portion of the refill 1, where the light emitter 3 has a light emitting surface facing away from the refill 1; a light signal sensing element 4 on a side of the end portion of the refill 1, where the light signal sensing element 4 is configured to sense a light beam S emitted by the light emitter 3 and to output coordinate information of a position irradiated by the light beam S; and a micro control unit (MCU) 5 connected with the light signal sensing element 4 via a signal, where the MCU is configured to generate a corresponding drive signal according to the coordinate information of the position output by the light signal sensing element 4 and to send the drive signal to a touch screen 10 via the refill 1.

Figure 3:
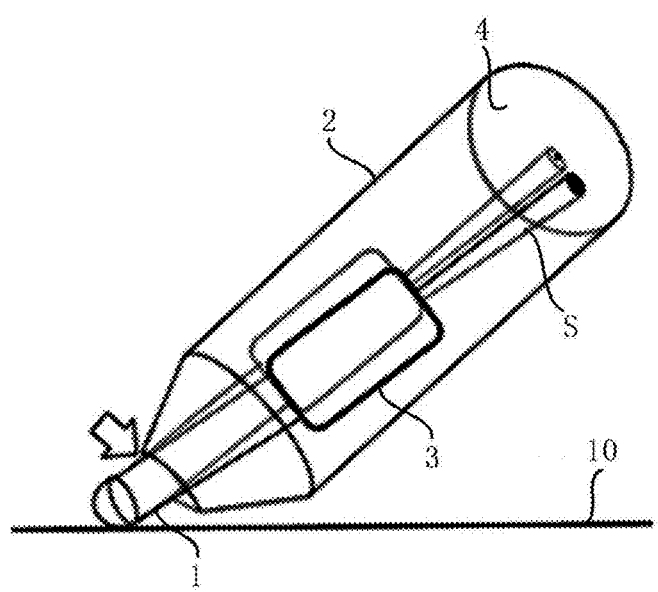
FIG. 3 is a schematic diagram of a deflection change of a refill of a stylus according to the embodiments of the disclosure in a process of touching a touch screen.
Figure 4:
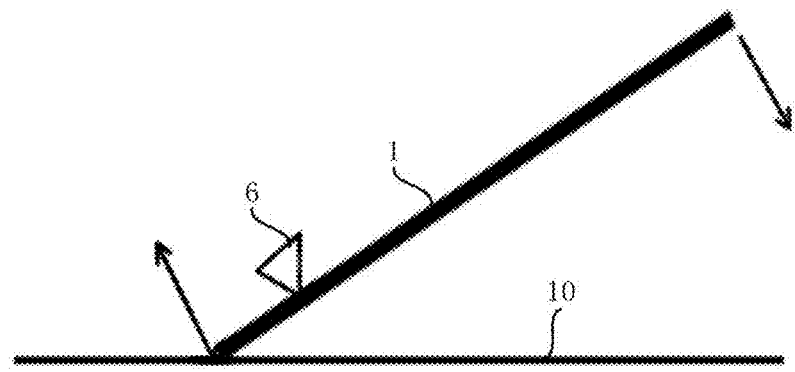
FIG. 4 is a principle diagram of a lever deflection motion of a refill in a stylus according to the embodiments of the disclosure.

According to the above stylus in the embodiments of the disclosure, when a user uses the refill 1 to press the touch screen 10, the refill 1 may undergo a lever motion by taking the clamping piece 6 as a pivot; and as illustrated in FIG. 3 and FIG. 4, the end portion of the refill 1 will deflect in different degrees with varying pressures and/or pen holding postures of the user according to a lever principle, and then an emitting direction of the light beam S of the light emitter 3 at the end portion of the refill 1 will be changed directly, thereby leading to a change of the position, irradiated by the light beam S, on the light signal sensing element 4; the light signal sensing element 4 can sense the irradiation of the light beam S and output the coordinate information of the position irradiated by the light beam S; and the MCU 5 receives and identifies the position coordinate information and can generate a corresponding drive signal according to the position coordinate information and transmit the drive signal to the touch screen 10 via the refill 1, so as to enable the touch screen 10 to realize different functions. In a word, the embodiments of the disclosure provide a newly-designed stylus, so that the user can control the functions of the touch screen by changing the pressures and/or pen holding postures on the stylus, thereby meeting more touch requirements and enhancing the application experience of the stylus accordingly.

In some embodiments, the light signal sensing element 4 is a light sensor layer including at least one light sensor. In some embodiments, a light sensor can be a sensing element such as a photosensitive diode or a photosensitive resistor. And any one of the at least one light sensor in the light sensor layer can generate an induced current after being irradiated by the light beam S and send the induced current to the MCU 5; the MCU 5 can identify the coordinate information of the position irradiated by the light beam S according to a position coordinate number of the light sensor.

Figure 6:
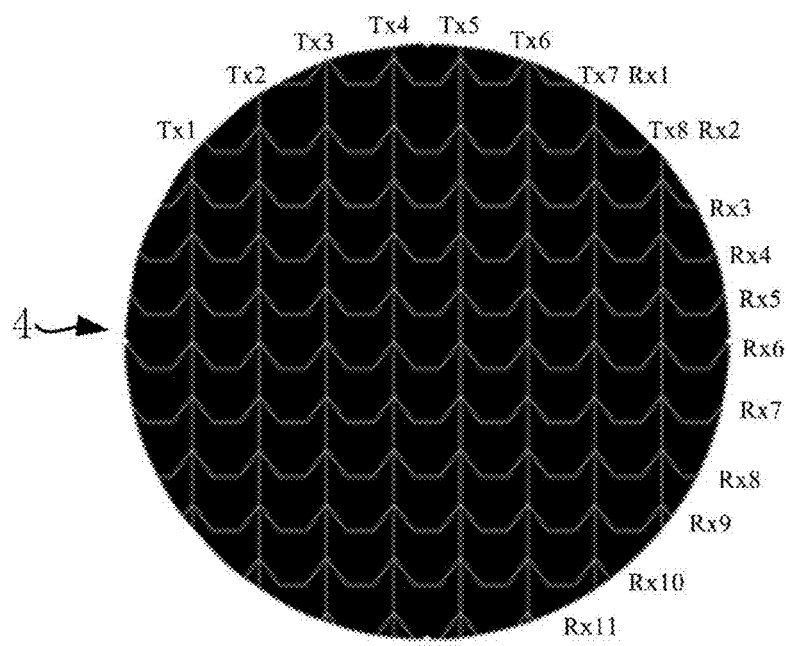
FIG. 6 is a scanning principle diagram of position coordinates of a light signal sensing element according to the embodiments of the disclosure.

In some embodiments, as illustrated in FIG. 6, the light signal sensing element 4 is a light sensor panel. Where the structure of the light sensor panel is similar to a touch panel, and a light sensing element layer and an electrode layer thereof can be obtained using a semiconductor process. In some embodiments, a light sensing element can be a thin film component having a function of a sensing element such as a photosensitive diode or a photosensitive resistor. When the light sensing element layer is irradiated by the light beam S, a parameter such as a capacitance or a resistance thereof will vary, and the electrode layer can obtain coordinate information of a position corresponding to the varying parameter through electrical signal scanning (Tx and Rx), and send the coordinate information of the position to the MCU 5 for processing through a signal line.

In some embodiments, the MCU 5 can identify a corresponding position coordinate (x, y) after receiving the position coordinate information of the light signal sensing element 4, and can calculate a distance between the position coordinate (x, y) and an initial center coordinate (0, 0) according to an equation of $L=\sqrt{(x-0)^2+(y-0)^2}=\sqrt{x^2+y^2}$. Where the initial center coordinate is a position coordinate of the light beam S sensed by the light signal sensing element 4 when the refill 1 is under no pressure (namely when the light beam S is not deviated). That is, the MCU 5 can obtain an offset of the position of the light beam S when the refill 1 is under pressure, and can further generate a drive signal according to the offset (i.e. a distance calculation result).

In some embodiments, a set number of distance grades are stored in the MCU 5, and the distance grades correspond to a plurality of frequencies of the drive signal in a one-to-one manner. When a distance (an offset), calculated by the MCU 5, between the coordinate of the deflected position of the light beam S and the coordinate of the original irradiation position of the light beam S is within a range of a certain distance grade, the MCU 5 is controlled to emit a drive signal with a frequency corresponding to the distance grade.

Figure 7:
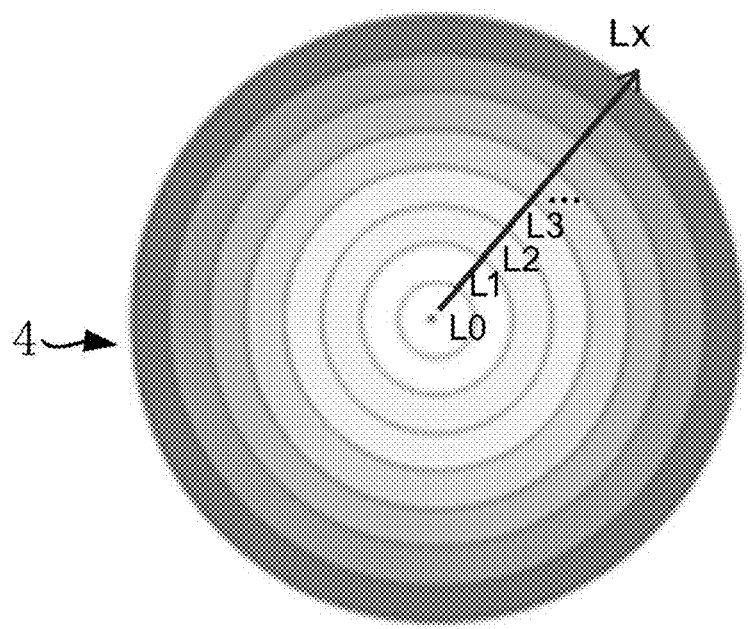
FIG. 7 is a division principle diagram of distance grades on a light sensing surface of a light signal sensing element according to the embodiments of the disclosure.

In some embodiments, as illustrated in FIG. 7, taking a circular light sensing surface of the light signal sensing element 4 for example, a center position of the light sensing surface acts as a position of the initial center coordinate, and the light sensing surface is divided into a plurality of annular regions L0, L1, L2, L3, ... Lx at equal intervals from the center towards the outside. Where distances between coordinate points in each annular region and the coordinate of the center belong to a same distance grade, namely each annular region corresponds to one distance grade, and each distance grade corresponds to one frequency of the drive signal, so that when the light beam S irradiates different annular regions, as illustrated in FIG. 3 and FIG. 7, the MCU 5 is controlled to emit drive signals with different frequencies; and the touch screen 10 can make different responses when sensing the drive signals with the different frequencies.

In some embodiments, as illustrated in FIG. 1 and FIG. 3, the light emitter 3 can be an infrared emitter composed of an infrared diode and can emit an infrared beam S with a certain taper. In some embodiments, the light emitting surface of the light emitter 3 is perpendicular to the refill 1, and faces directly to the light sensing surface of the light signal sensing element 4 when the refill 1 is under no pressure.

Figure 5:
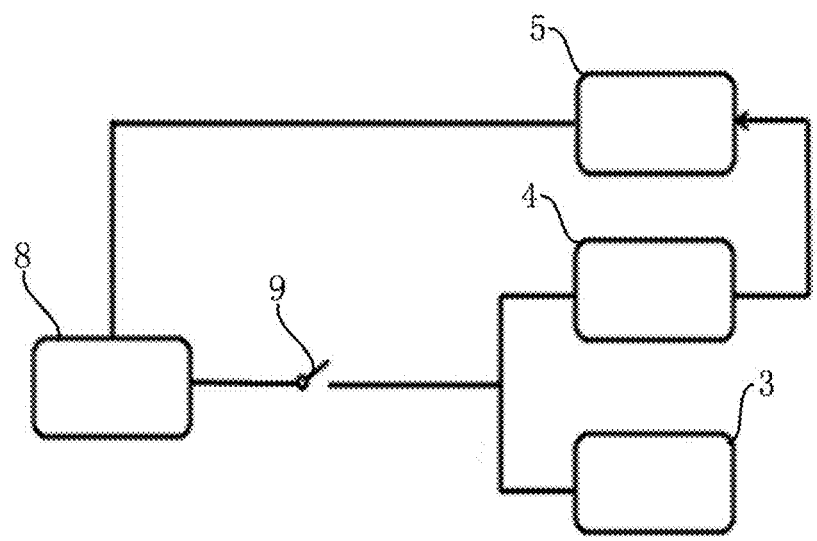
FIG. 5 is a structural block diagram of a stylus according to the embodiments of the disclosure.

In some embodiments, as illustrated in FIG. 1 and FIG. 5, the stylus according to the embodiments of the disclosure further includes a power supply 8; where the power supply 8 is electrically connected to various power consuming elements such as the light emitter 3, the light signal sensing element 4 and the MCU 5, and is configured to provide power to the various power consuming elements.

In some embodiments, as illustrated in FIG. 5, the stylus according to the embodiments of the disclosure further includes a power switch 9. In some embodiments, the first terminal of the power switch 9 is connected with the power supply 8, and the second terminal of the power switch 9 is connected with the light emitter 3 and the light signal sensing element 4; and the on and off of the two terminals of the power switch 9 can be controlled by driving a control terminal of the power switch 9, so as to control the on and off of the light emitter 3 and the light signal sensing element 4. For example, when the user turns on the switch "ON/OFF", the light emitter 3 and the light signal sensing element 4 can start to work or stop working.

In some embodiments, the power supply 8 can be directly connected with the MCU 5, so that the MCU will be always in a working state as long as the power supply 8 has power.

In some embodiments, the stylus according to the embodiments of the disclosure can further include a pressure sensor and a tilt sensor, etc. All of these sensors can be connected with the MCU 5 via a signal, so as to realize a sense and a functional response to more writing changes.

Figure 2:
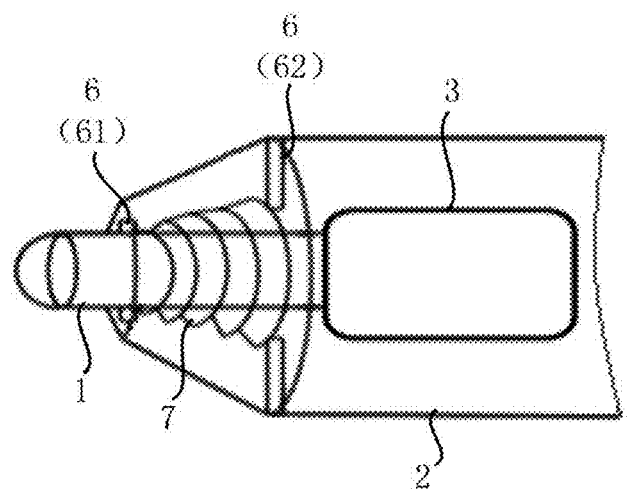
FIG. 2 is a structural schematic diagram of a front end of a stylus according to the embodiments of the disclosure.

In some embodiments, as illustrated in FIG. 2, two groups of clamping pieces 6 and a spring piece 7 are provided at a front end of the body. Where a front clamping piece 61 is connected with the refill 1 to prevent the refill 1 from moving forwards; a rear clamping piece 62 is connected with the housing 2; a front end of the spring piece 7 is connected with the front clamping piece 61, and a rear end of the spring piece 7 is abutted with the rear clamping piece 62; and the spring piece 7 cooperates with the rear clamping piece 62 to prevent the refill 1 from moving backwards. Further, as a buffer component, the spring piece 7 can allow the lever deflection motion of the refill 1 to be free from limitation of the clamping pieces 6. In addition, it shall be noted that, when the refill 1 touches the touch screen 10 to get stressed, the refill 1 can deflect by taking the front clamping piece 61 as a pivot or deflect by taking the rear clamping piece 62 as a pivot, and both of the two deflection approaches can be implemented through particular structures, which will not be limited herein.

Further, based upon the same inventive concept, the embodiments of the disclosure further provide a human-machine interactive apparatus; where the human-machine interactive apparatus includes the stylus in any one of the above embodiments.

In some embodiments, the human-machine interactive apparatus further includes a touch display panel cooperatively used with the stylus.

In some embodiments, the touch display panel can receive a drive signal sent by the stylus and respond with different functions according to a change of frequency of the received drive signal.

In some embodiments, the touch display panel can display lines with different thicknesses according to the change of frequency of the drive signal. For example, as illustrated in FIG. 1 and FIG. 3, when a user writes and paints with different strengths or in different pen holding postures, a deflection angle generated by the refill 1 according to the lever principle varies therewith, so that a position, irradiated by the light beam S from the light emitter 3 connected with the refill 1, on the light sensing surface of the light signal sensing element 4 may also deflect accordingly; the MCU 5 may calculate an offset of the position and emit a drive signal to the touch screen 10 according to a frequency corresponding to the offset; and the touch screen 10 may display lines with different thicknesses according to the change of frequency of the drive signal, so that the user can have an experience feeling similar to real writing. In some embodiments, the offset and the thickness of the line can be set to be positively correlated, so for a user having a pen holding posture that allows the refill 1 to be perpendicular to a paper, the offset of the refill 1 is relatively small, and the drawn lines are relatively thin; and when the user have a pen holding posture that allows the refill 1 to be in a relatively large inclination to the paper, the offset of the refill 1 is relatively large, and the drawn lines are relatively thick. Therefore, these two situations are consistent with the real writing feeling, which may enhance the writing and painting experiences of the user.

Evidently those skilled in the art can make various modifications and variations to the disclosure without departing from the spirit and scope of the disclosure. Accordingly the disclosure is also intended to encompass these modifications and variations thereto so long as the modifications and variations come into the scope of the claims appended to the disclosure and their equivalents.

The invention claimed is:

1. A stylus, comprising:
a body, wherein the body comprises a refill, a housing surrounding the refill, and a clamping piece between the refill and the housing; wherein the refill is able to perform a lever deflection motion by taking the clamping piece as a pivot when it is under a pressure;
a light emitter, provided in the housing, fixedly connected with an end portion of the refill, and having a light emitting surface facing away from the end portion of the refill, wherein the end portion of the refill is provided in the housing;
a light signal sensing element, provided in the housing, arranged on a side of the end portion of the refill, and configured to sense a light beam emitted from the light emitting surface of the light emitter and to output coordinate information of a position irradiated by the light beam; and
a micro control unit, connected with the light signal sensing element via a signal and configured to generate a corresponding drive signal according to the coordinate information output by the light signal sensing element and to send the drive signal to a touch screen via the refill.

2. The stylus according to claim 1, wherein the clamping piece comprises a front clamping piece and a rear clamping piece, the front clamping piece is connected with the refill, and the rear clamping piece is connected with the housing;
wherein the body further comprises a spring piece; wherein a front end of the spring piece is connected with the front clamping piece, and a rear end of the spring piece is abutted with the rear clamping piece.

3. The stylus according to claim 1, wherein the light signal sensing element is a light sensor panel or a light sensor layer comprising at least one light sensor.

4. The stylus according to claim 1, wherein the micro control unit is further configured to:
identify a corresponding position coordinate after receiving the coordinate information output by the light signal sensing element;
calculate a distance between the identified position coordinate and an initial center coordinate; and
generate a drive signal according to the calculated distance; wherein the initial center coordinate is a position coordinate of the light beam sensed by the light signal sensing element when the refill is under no pressure.

5. The stylus according to claim 4, wherein a set number of distance grades are stored in the micro control unit, and the distance grades correspond to a plurality of frequencies of the drive signal in a one-to-one manner; and
the micro control unit is further configured to emit a drive signal with a frequency corresponding to a certain distance grade when the calculated distance is within a range of the certain distance grade.

6. The stylus according to claim 1, wherein the light emitter is an infrared emitter.

7. The stylus according to claim 6, wherein the light emitting surface of the light emitter is perpendicular to the refill, and faces directly to a light sensing surface of the light signal sensing element when the refill is under no pressure.

8. The stylus according to claim 1, wherein the stylus further comprises a power supply electrically connected to the light emitter, the light signal sensing element and the micro control unit;
wherein the power supply is configured to provide power to the light emitter, the light signal sensing element and the micro control unit.

9. The stylus according to claim 8, wherein the stylus further comprises a power switch connected between the light emitter, the light signal sensing element, and the power supply;
wherein the power switch is configured to control on and off of the light emitter and the light signal sensing element.

10. The stylus according to claim 1, wherein the stylus further comprises a pressure sensor and a tilt sensor; wherein the pressure sensor and the tilt sensor are connected with the micro control unit via a signal, respectively.

11. A human-machine interactive apparatus, comprising the stylus according to claim 1, and a touch display panel cooperatively used with the stylus.

12. The human-machine interactive apparatus according to claim 11, wherein the touch display panel is configured to receive a drive signal sent by the stylus and to display lines with different thicknesses according to a change of frequency of the drive signal.

13. The human-machine interactive apparatus according to claim 11, wherein the clamping piece comprises a front clamping piece and a rear clamping piece, the front clamping piece is connected with the refill, and the rear clamping piece is connected with the housing;
wherein the body further comprises a spring piece; wherein a front end of the spring piece is connected with the front clamping piece, and a rear end of the spring piece is abutted with the rear clamping piece.

14. The human-machine interactive apparatus according to claim 11, wherein the light signal sensing element is a light sensor panel or a light sensor layer comprising at least one light sensor.

15. The human-machine interactive apparatus according to claim 11, wherein the micro control unit is further configured to:
identify a corresponding position coordinate after receiving the coordinate information output by the light signal sensing element;
calculate a distance between the identified position coordinate and an initial center coordinate; and
generate a drive signal according to the calculated distance; wherein the initial center coordinate is a position coordinate of the light beam sensed by the light signal sensing element when the refill is under no pressure.

16. The human-machine interactive apparatus according to claim 15, wherein a set number of distance grades are stored in the micro control unit, and the distance grades correspond to a plurality of frequencies of the drive signal in a one-to-one manner; and
the micro control unit is further configured to emit a drive signal with a frequency corresponding to a certain distance grade when the calculated distance is within a range of the certain distance grade.

17. The human-machine interactive apparatus according to claim 11, wherein the light emitter is an infrared emitter.

18. The human-machine interactive apparatus according to claim 17, wherein the light emitting surface of the light emitter is perpendicular to the refill, and faces directly to a light sensing surface of the light signal sensing element when the refill is under no pressure.

19. The human-machine interactive apparatus according to claim 11, wherein the stylus further comprises a power supply electrically connected to the light emitter, the light signal sensing element and the micro control unit;
   wherein the power supply is configured to provide power to the light emitter, the light signal sensing element and the micro control unit.

20. The human-machine interactive apparatus according to claim 19, wherein the stylus further comprises a power switch connected between the light emitter, the light signal sensing element, and the power supply;
   wherein the power switch is configured to control on and off of the light emitter and the light signal sensing element.

\* \* \* \* \*